(12) United States Patent
van Wijngaarden et al.

(10) Patent No.: US 7,278,530 B2
(45) Date of Patent: Oct. 9, 2007

(54) APPARATUS FOR SINGULATING PRODUCTS

(75) Inventors: Erik van Wijngaarden, Hengelo (NL); Wouter van den Berg, Voorburg (NL)

(73) Assignee: FPS Food Processing Systems, B.V. (NL)

( * ) Notice: Subject to any disclaimer, the term of this patent is extended or adjusted under 35 U.S.C. 154(b) by 0 days.

(21) Appl. No.: 11/345,631

(22) Filed: Feb. 2, 2006

(65) Prior Publication Data
US 2006/0185963 A1 Aug. 24, 2006

(30) Foreign Application Priority Data
Feb. 2, 2005 (EP) ................... 05075263

(51) Int. Cl.
*B65G 47/12* (2006.01)
(52) U.S. Cl. ...................... 198/448; 198/453
(58) Field of Classification Search ........... 198/448, 198/453, 454, 455
See application file for complete search history.

(56) References Cited

U.S. PATENT DOCUMENTS 3,866,739 A * 2/1975 Sikorski ............... 198/453
4,489,820 A 12/1984 Schneider et al.
5,147,023 A 9/1992 Meindl
5,415,281 A * 5/1995 Taylor et al. ............... 198/448
5,531,311 A * 7/1996 LeMay et al. ............... 198/448
2005/0133344 A1 6/2005 Van Wijngaarden et al.

FOREIGN PATENT DOCUMENTS

GB 1 386 209 3/1975
JP 63-306122 12/1988

* cited by examiner

*Primary Examiner*—James R. Bidwell
(74) *Attorney, Agent, or Firm*—Stites & Harbison PLLC; Marvin Petry

(57) ABSTRACT

An apparatus is provided for singulating substantially round products. The apparatus includes an endless feed conveyor belt on which the products are supplied in a conveying direction T, and a singulator conveyor comprising two sections V1, V2, forming a V-channel. The sections are located in substantially two planes which, each section is at an angle to a horizontal plane, which intersect along an intersecting line parallel to the conveying direction T. At least one additional endless belt B1, B2, . . . , B(n-1) is provided on one side of the two sections V1, V2. Each additional belt is to a side of the intersecting line and parallel to the one section, and is in substantially the same plane as the one section. The speed of the additional belt is greater than the speed of the one section V1, V2 belt. Advantageously, the speed of belts situated further outwards is less, and the V-channels preferably have an angle curvature of 0° at the upstream end to, minimally, 5° at the downstream end.

9 Claims, 2 Drawing Sheets

APPARATUS FOR SINGULATING PRODUCTS

FIELD OF THE INVENTION

The present invention relates to an apparatus for singulating products supplied in bulk and, in particular, an apparatus for singulating substantially round products, such as fruits and potatoes.

BACKGROUND OF THE INVENTION

Prior singulator apparatus are known in the art, including an apparatus disclosed in JP 63306122 (hereinafter "JP '122"). From this publication, two sections of a singulator conveyor jointly form a V-channel. Although these sections are not symmetrical, they terminate virtually at the same height on both sides of the channel. In particular, one of the sections is built up from two endless belts running at the same speed, while the outermost of these two belts vibrates in a direction perpendicular to the plane of this outer belt. As this second belt in such a V-channel is located further outwards, it is higher than the innermost of these two belts. What is achieved in this manner is that due to the vibrating belt situated further outwards, the conveyed products such as fruits or potatoes roll towards the lower, central part of the V-channel, along the intersecting line of the two sections, and, at that location, will attempt to occupy a position between the products already conveyed therein.

However, such an apparatus exhibits several shortcomings. Firstly, it will be clear that through the vibration of the belt situated further outwards, in particular fragile products such as peaches and tomatoes can become damaged. Further, when large quantities are supplied, the receiving capacity is too small. Increase in scale will cause such an apparatus to become disproportionally heavy and voluminous.

SUMMARY OF THE INVENTION

To provide a solution precisely to overcome deficiencies in the art, including those of JP '122, the apparatus according to the present invention includes, next to one of the two sections, V1, V2, at least one additional endless belt B1, B2, . . . , B(n−1), Bn. Each additional belt is further to a side of an intersecting line formed as the intersection of the sections V1, V2 and parallel to the one section. Each additional belt is substantially in the same plane as the mentioned first section, and each additional belt runs in the same direction T, with Bn arranged further to a side than B(n−1) while the speed of the first section is greater than the speed of the at least one additional endless belt.

Thus, highly advantageously, any quantity of supplied products is enabled to gradually merge or align. As a result, the present apparatus is highly suitable for any type of product.

In a further embodiment, the apparatus according to the present invention is characterized in that for each further belt B1, B2, . . . , B(n−1), Bn, with corresponding speeds v(1), v(2), . . . , v(n−1), v(n), it holds that v(1)>v(2) . . . > v(n−1)>v(n).

With great advantage, the gradual alignment is realized for all products, also the products located further outwards. A further advantage is that this apparatus allows further scaling up, in particular a widening of the supply track.

A different embodiment of the apparatus according to the present invention is characterized in that the V-channel has an angle curvature with the horizontal, calculated for each section. V1, V2, of substantially 0° at the transition of the feed conveyor belt to the singulator conveyor, increasing gradually to an angle greater than 5°. Preferably, this is a value in the range of 15° to 45°.

It has appeared in a highly advantageous manner that owing to the twist or torsion of the two V-channel surfaces, a much larger part of the products to be singulated than before is actually singulated. Whereas, in JP '122, the center portion of the V-channel ends up from the V-shape into horizontal shape, conversely, in the apparatus of the present invention, maximum singulation is achieved. Furthermore, as the supply is substantially horizontally, not only will a greater quantity be transferred and singulated but in particular a better spread over the entire width of the singulating conveyor will be achieved. Precisely because of this, all products located, presently, next to each other will have the chance to align.

The present apparatus is distinguishable from U.S. Pat. No. 5,147,023 (hereinafter "the '023 patent"). The '023 patent discloses a conveyor belt for bottles. With such a conveyor, large quantities of bottles supplied over a wide belt are arranged abreast of each other. Upstream, this wide belt comprises a part having belts running side by side at equal speed, and downstream a part having belts running at a speed decreasing in outward direction. In this second part, all these belts make the same angle with the horizontal and thus form a single continuous surface, at an inclination with respect to a horizontal plane. As a consequence, in this second part, bottles lean against each other at an inclination, while leaning, on one side of the conveyor, against a correspondingly inclined wall. At the end of the apparatus, a rail urges the bottles towards a vertical position on a horizontal end belt. Such an apparatus is not suited for round products because when supplied obliquely, the products end up on top of each other instead of, precisely, side by side, so that further alignment becomes impossible. Further, the products will fall from the end of the single, horizontal discharge belt.

Further exemplary embodiments are characterized in that:

the angle mentioned for each surface of the section of the V-channel is adjustable by means of a system of adjustable support beams;

the at least further belts are driven by means of a driving pulley while for each further belt, a drive pulley part is provided in accordance with the speed mentioned;

the drive pulley consists of a single body formed from plastic;

for each speed, the drive pulley comprises pulley parts that are detachably attachable to a drive shaft;

the width of the further belt Bn has, at most, half the width of the average length of the products to be singulated.

BRIEF DESCRIPTION OF THE DRAWINGS

Details of the embodiments of the present invention will be elucidated hereinbelow with reference to the drawing. In the drawing.

DETAILED DESCRIPTION

In the various Figures, the same numerals or symbols represent the same portions or parts.

Figure 1:
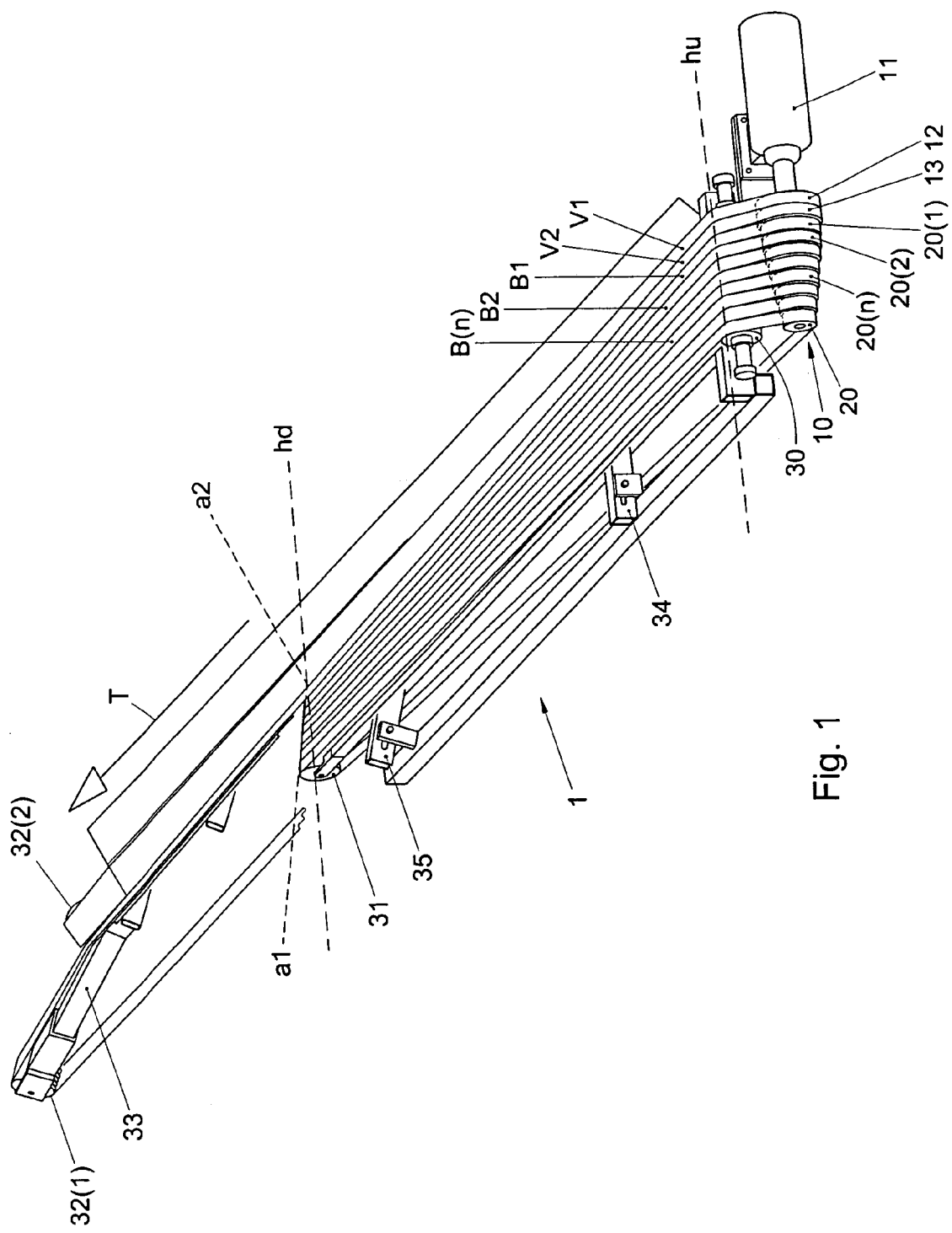
FIG. 1 schematically shows a perspective view of the apparatus according to the invention.

FIG. 1 schematically represents a perspective view of an apparatus according to the present invention, more particularly a singulator conveyor 1. It conveys the products, substantially round products, for instance fruits or potatoes, in a conveying direction T. This conveyor is driven by a drive pulley 10. The drive pulley 10 is coupled to, for instance, an electric motor 11. The products are supplied by a feed conveyor not represented in the Figure.

As a rule, such a feed conveyor is a flat, endless belt driven in a known manner. At the upstream side thereof, the products are unloaded or poured onto this feed conveyor, for instance from boxes or crates, thus spreading the products over the width thereof, while this width is at least as wide as that of the singulator conveyor 1 represented. At the downstream side hereof, at the location of the drive pulley 10, the products are transferred to the singulator conveyor 1, while the transfer is typically effected with substantially flat guiding plates.

As represented in FIG. 1, the singulator conveyor 1 roughly runs from a horizontal end line $h_u$ indicated upstream in the generally substantially horizontal conveying direction T, as far as an end line $h_d$ situated downstream, the end lines $h_u$ and $h_d$ being perpendicular to the conveying direction T.

The singulator conveyor is composed of a number of belts, viz. two V-channel belts V1 and V2, and, next thereto belts B1, B2, . . . , B(n). In general, these belts are flat. The indication B(n) indicates that, depending on the technical requirements, at least one single belt is involved, while, at the same time, it is to be taken into account that also, several belts can be involved, with the index n as natural number. In the exemplary embodiment according to FIG. 1, eight belts are drawn. All these belts are driven by the drive pulley 10, then run on a guide roller 30 while at the end of the section having belts B1, B2, . . . B(n), an end roller is used. Generally, these rollers 30 and 31 are not driven and are free-running.

The drive pulley 10 is built up from pulley parts 12, 13, 20(1), 20(2), 20(3), . . . , 20(n), to be considered as drive shave parts. The parts 12 and 13 have the same diameter, the diameter of the remaining parts 20(1) to 20(n) are smaller, with the diameter of each subsequent one being smaller than that of the one preceding. To a skilled person, it will be clear that thus, the magnitude of the running speeds of the belts develop concurrently, with v12=v13, while these speeds are greater than those of the other belts, i.e. v20(1) to v20(n), while v20(1)>v20(2)> . . . v20(n). For the sake of completeness, it is noted that the pulley parts can be detachable, while such a drive pulley as a whole, or parts thereof, are manufactured from suitable material, for instance a particular plastic.

The belts V1, V2 run on end rollers 32(1), 32(2). More particularly, it is indicated how at a particular moment, these belts diverge, while the singulated products are transferred to a processing apparatus arranged further downstream. The characteristics of the represented, diverging belts V1 and V2 are further described in priority publication EP0378789.9, also from applicant, more particularly how the products are transferred from such V-shaped channels to a roller belt. The running surfaces of the pulley parts and of the rollers 30, 31, 32 are designed in a suitable manner, such as for instance edges at the underside of the belts fitting, in turn, into corresponding grooves.

With such a roller belt or roller conveyor, it is often possible to weigh or image the products, or also subject them to other detection techniques, while they are being classified. On the basis of this classification, the products are then sorted, i.e. unloaded on discharge tracks suitable to these classifications. Usual speeds for processing speeds, i.e. speeds at which the roller conveyor conveys the products, are in the range of 5 to 20 products a second, which generally means chain speeds between 0.5 and 20 m/s. The discharge tracks mentioned can also form packaging lines. In FIG. 1, further, a tensioning rod is shown with which the belts can be tensioned so that a steady transport of products is ensured.

A further important characteristic can be derived from the interrupted lines a1, a2. They indicate how, at the location of the end roller 31, the planes are located in which the belts proceed on both sides of the intersecting line of the V-channel belts, and, in particular, how the torsion of the planes of the belts proceeds relative to the horizontal $h_u$ located upstream. More particularly this means that the angle a belt makes with a horizontal plane increases in downstream direction. This is arranged such that the belts mutually link up with each other completely. As already mentioned hereinabove, is has appeared that due to the features described hereinabove, the merging or alignment of the products is improved considerably. It should further be noted that by starting with a small angle, preferably 0° at the upstream end of the singulator conveyor, large quantities of products can be processed and treated in this manner without accumulations already forming at that location. The angles formed by a1 and a2 will mostly be equal, while such an angle is, at least, 5°, and will typically be set at a value of between 15° and 45°. It should be taken into account here that the angle is not too small, so that the products are not sufficiently urged to take up positions along the intersecting lines, for instance in the case of larger and heavier products, nor should the angle be too great so that the products start accumulating or even become stuck between the belts.

Further, in FIG. 1, adjustable support beams 34, 35 are shown with which the above-mentioned torsion can be adjusted. Generally, such torsion will proceed gradually. However, when twisting paths are desired, i.e. paths through which the angle remains substantially constant, this can also be achieved with such beams, while several beams will be provided.

Figure 2:
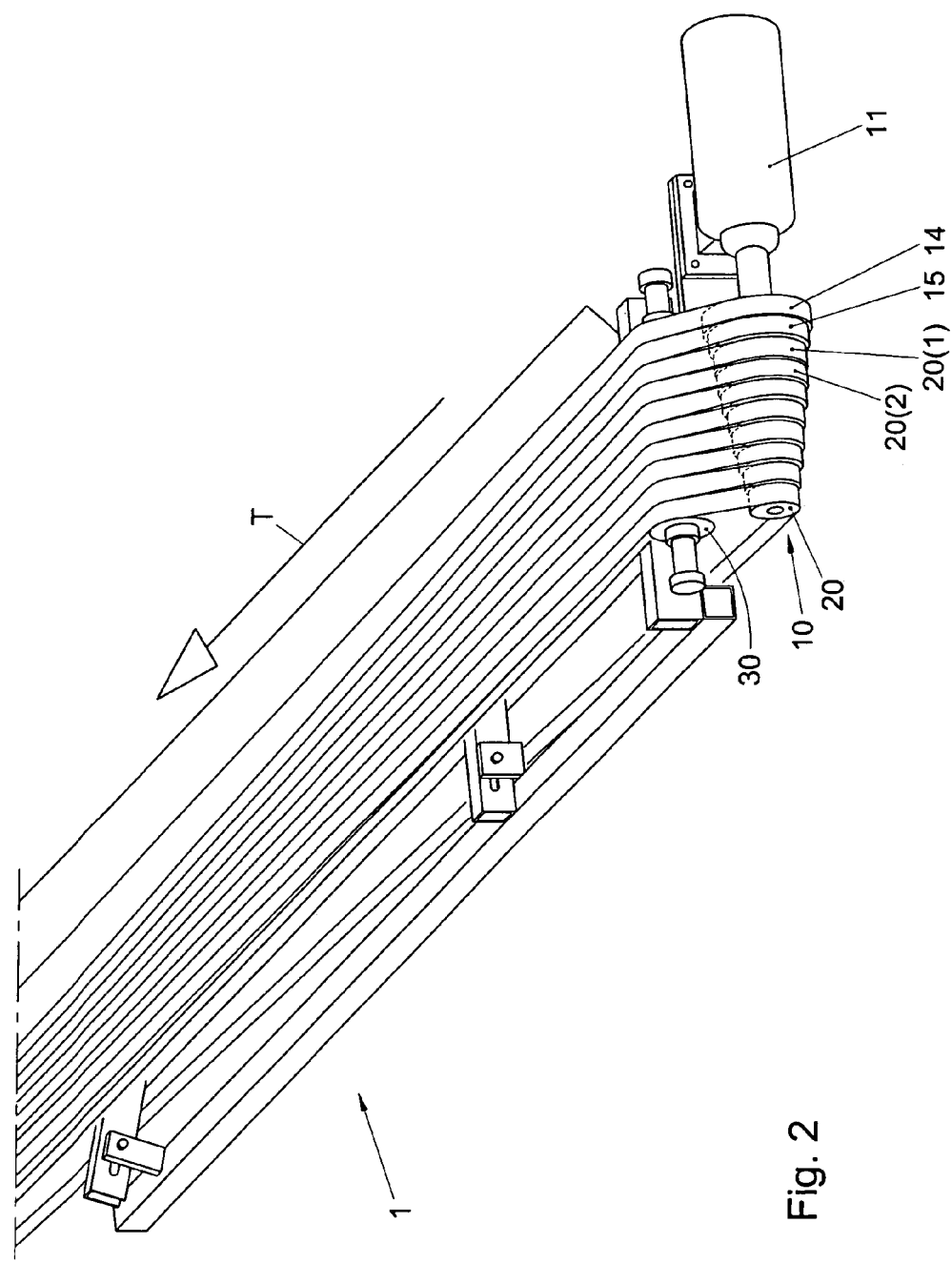
FIG. 2 also gives a perspective view of a further exemplary embodiment of the apparatus according to the invention.

In FIG. 2, a similar perspective view is shown, presently of a second exemplary embodiment. Here it is represented how the drive pulley 10 for the V-channel belts comprises two pulley parts 14, 15 with different diameters. In the same manner as described hereinabove, the speeds will differ accordingly. It has appeared that in this manner, specific types of products are singulated better.

In a further exemplary embodiment of the invention, the width of the belts Bn is chosen such that with several of the belts Bn a product such as for instance a pear is spread over two belts. It has appeared that due to this manner of carrying along, in particular the turning of such a product achieved herewith, the alignment is improved further. With so-called unround products, the dimension of the greatest length appears of importance.

Other sections of such a drive pulley are not represented. It will be clear that section in with which the speed of one (or more) of the belts B is greater than that of a belt located further inwards, can, conversely, improve the alignment of specific types of fruits, for instance paprika's or pears.

It will be clear to any person skilled in the art that an optimal effect can be realized through the choice of the lengths, the widths, angles as well as the speeds of all the belts mentioned. This implies that for these parameters, for each different type of product or fruit, a corresponding, different combination will be chosen. Further, for instance the roughness of the belt surfaces should be taken into account, while even burls of, for instance, plastic or rubber can be included on the belt surfaces. Depending on the type of product, this can vary from very smooth to somewhat hairy. Small variants and modifications of the apparatus and exemplary embodiments as described hereinabove are understood to fall within the scope of protection of the appended claims.

The invention claimed is:

1. An apparatus for singulating products which are substantially round and supplied in bulk, said apparatus comprising:
    an endless feed conveyor belt on which the products are unloaded and are then supplied in a conveying direction T,
    an endless singulator conveyor, which follows said feed conveyor belt downstream, and which consists of two sections, V1, V2, with endless belts forming, substantially, a V-channel, the sections being located in substantially two planes, each respective plane being at an angle to a horizontal plane and intersecting along an intersecting line parallel to the conveying direction T, and
    at least one additional endless belt B1, B2, . . . , B(n−1) disposed on the side of one of the two said sections V1, V2, each additional belt being further to a side of said intersecting line and parallel to said one section, each additional belt being in substantially the same plane as said one section, and each additional belt running in the same direction T, Bn being provided further to a side than B(n−1), while the speed of said one section is greater than the speed of said at least one further endless belt,
    wherein the products, during conveying, are singulated and positioned substantially one behind the other in the direction of said intersecting line, and the products, thereupon, being transferred, one by one, from the V-channel to a processing apparatus.

2. The apparatus according to claim 1, wherein for each further belt, B1, B2, . . . , B(n-1), Bn, with corresponding speeds v(1), v(2), . . . , v(n−1), v(n), it holds that v(1)>v(2)> . . . >v(n−1)>v(n).

3. The apparatus according to claim 1, wherein said V-channel has an angle curvature to the horizontal, calculated for each section V1, V2, of substantially 0° at the transition of the feed conveyor belt, gradually increasing towards the singulator conveyor to an angle greater than 5°.

4. The apparatus according to claim 3, wherein said angle increases gradually to a value in the range of preferably 15° to 45°.

5. The apparatus according to claim 1, wherein the angle to the horizontal for each plane of the section of the V-channel is adjustable with a system of adjustable support beams.

6. The apparatus according to claim 1, wherein the at least additional belt is driven by means of a drive pulley while for each additional belt, a drive pulley part is provided in accordance with said speed.

7. The apparatus according to claim 6, wherein the drive pulley consists of a single body formed from plastic.

8. The apparatus according to claim 6, wherein for each speed, the drive pulley comprises pulley parts which are detachably attachable to a drive shaft.

9. The apparatus according to claim 1, wherein the width of said further belt Bn has at most half the width of the average length of the products to be singulated.

* * * * *